Aug. 29, 1972     O. A. ESSIET     3,687,693
PROCESS FOR EXTRACTING A SWEETENING AGENT FROM DIOSCOREOPHYLLUM
CUMMINSII BERRIES
Filed May 25, 1970
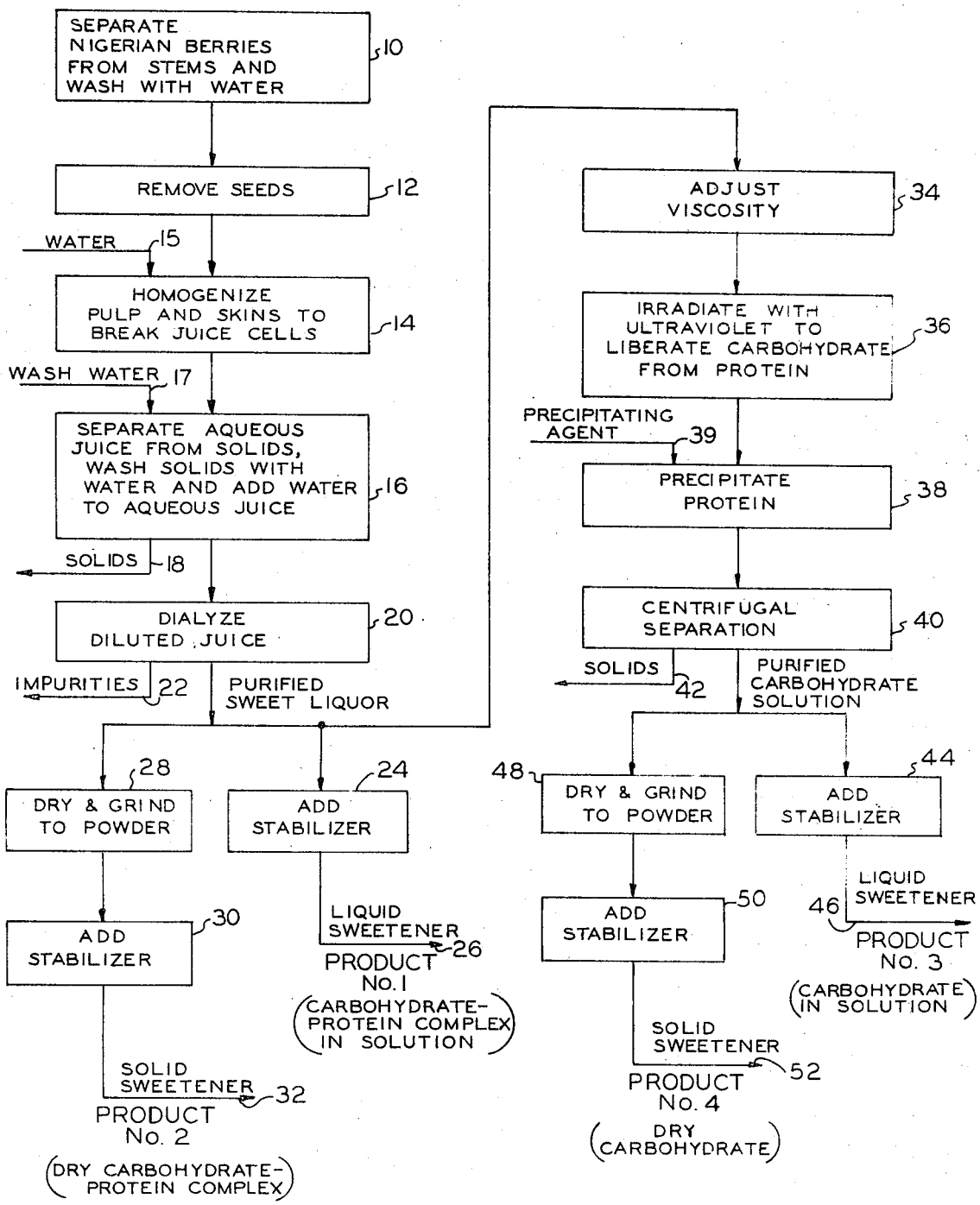
OKON A. ESSIET
INVENTOR
BY
BUCKHORN, BLORE, KLARQUIST & SPARKMAN
ATTORNEYS United States Patent Office 3,687,693
Patented Aug. 29, 1972

3,687,693
PROCESS FOR EXTRACTING A SWEETENING AGENT FROM *DIOSCOREOPHYLLUM CUMMINSII* BERRIES
Okon A. Essiet, 102 NE. 95th St., Portland, Oreg. 97220
Filed May 25, 1970, Ser. No. 40,185
Int. Cl. A23l 1/26
U.S. Cl. 99—141        7 Claims

ABSTRACT OF THE DISCLOSURE

An aqueous solution of a water-soluble, carbohydrate sweetening material is obtained from *Dioscoreophyllum cumminsii* berries by first isolating in solution the sweetening material in the form of a carbohydrate-protein complex, then irradiating the solution with ultraviolet radiation to break the carbohydrate-protein bond and then precipitating and removing the undesired protein.

BACKGROUND OF INVENTION

Numerous substitutes for sucrose have been employed as sweetening agents, particularly in dietary food products. These sweetening agents all have certain deficiencies. For example, saccharin has an unpleasant aftertaste, sucrol is only slightly soluble in water and the salts of cyclamic acid, known as cyclamates, have been reported to be dangerous to be health of the users.

The berries of the African plant *Dioscoreophyllum cumminsii*, also called Nigerian berries in this application, contain substantial amounts of a water soluble sweetening material which in its purified form has a sweetening effect on a dry weight basis about 1500 times as great as sucrose. This sweetening material has been isolated on a laboratory scale as described by G. E. Inglett and Joann F. May in the Journal of Food Science, volume 34 (1969) pages 408–411. The chemical composition of the sweetening agent is not definitely known. It is known, however, to be a carbohydrate having a molecular weight of the order of 10,000. It occurs as part of a carbohydrate-protein complex having a molecular weight of the order of 100,000. This complex has a sweetening effect of the order of 150 times that of sucrose on a dry weight basis.

The Nigerian berries grow in clusters resembling bunches of small grapes on climbing vines in the tropical forests of many portions of Africa including large areas in Nigeria. These berries are about ½ inch in diameter and have a single seed about 3/16 to ¼ inch in diameter surrounded by a white semi-solid pulp in turn surrounded by a red skin. The carbohydrate-protein complex referred to is contained primarily in the pulp and is water soluble. The carbohydrate of the complex can be liberated from the protein and is also water soluble. So far as known, the sweetening material either by itself or in combination with the protein of the complex referred to above has no detrimental physiological effect when ingested by humans, particularly in the amounts in which it must be used for producing an acceptable sweetening effect. This sweetening material in either form has no unpleasant aftertaste.

The Nigerian berries referred to are not at present employed for any useful purpose. For example, they are too sweet to be palatable in their natural form. Also no commercial process has been developed to recover the sweetening material and reduce it to marketable form.

SUMMARY

The present invention is concerned with recovering the sweetening material contained in Nigerian berries, either as the carbohydrate-protein complex discussed above, or as the carbohydrate which has been separated from the protein. This recovery is carried out in a manner which reduces the impurities contained in the resultant material to a minimum. For example, it has been found that mechanical homogenization treatment of the skins and pulp in the presence of added water, after substantially all of the seeds have been removed from the berries, can be efficiently employed to break down the cells of the berry pulp and liberate substantially all of the water soluble carbohydrate-protein complex contained in such cells to the extent that simple filtration or centrifugal separation operations can be used to obtain high yields of the complex in aqueous solution without prior treatment of the mechanically homogenized material with enzymes or other extraneous materials. The sweetening materials may be recovered in the form of liquid sweetener materials or in the form of a water soluble dry sweetener materials. These materials are chemically stable under usual ambient temperature conditions and can be further stabilized against deterioration by fungicidal action.

It is therefore an object of the present invention to provide a process of recovering sweetener materials which are many times sweeter than sucrose from Nigerian berries on a commercial scale and in a manner providing purified stable products.

BRIEF DESCRIPTION OF THE DRAWING

The figure of the drawing is a flow sheet diagrammatically illustrating a preferred embodiment of the process of the invention.

DESCRIPTION OF PREFERRED EMBODIMENT

As indicated at 10 in the drawing, the Nigerian berries are first removed and separated from the stems of the bunches in order to facilitate further processing of the berries. This can be done manually, for example, as the bunches are carried on a conveyor belt past workers who remove the berries from the stems, or the berries can be mechanically stripped from the stems, for example, by upper and lower comb-like members having relatively widely spaced wire teeth, with the teeth of the two members directed toward each other. The berries are then washed with water to remove extraneous impurities and the water discarded.

The seeds of the Nigerian berries have a thin shell covered with very short spines surrounding a kernel having an appearance and consistency similar to that of a very small garden pea. These seeds not only interfere with treatment of the berries to separate the aqueous sweetening material from the solids of the berries, but the kernels contain an extremely bitter material which is liberated if the shell of the seed is cut or broken. This bitter material is difficult to remove from the recovered sweetening material and it is important to remove and discard the seeds at an early stage in the process. A seed removal step is indicated at 12 and a preferred operation is to employ a machine analogous to a cherry pitting machine in which the seed is pushed or punched out of the fruit leaving the pulp and skin. It is almost impossible to remove all of the seeds from the berries as almost inevitably a few of the berries will be missed, and care must be taken not to cut or break the seeds in further steps of the process.

After as many of the seeds as practical have been removed from the berries, the remaining material including any berries from which the seeds have not been removed are further treated as indicated at 14 to break down the cells of the pulp to thereby liberate the water soluble carbohydrate-protein complex referred to above so that it can be removed in water solution. An amount of water approximately equal to twice the weight of the original berries being processed is preferably added as indicated at 15 and the mixture subjected to a homogenizing operation preferably in a vessel such as a stainless steel tank, in which an agitator of the impeller type is rotated at high speed. The blades of such impeller are preferably made of resilient plastic or rubber to assist in preventing any breaking or cutting of the shells of residual seeds in the mixture. The impeller is therefor run at a speed just below that at which the seeds are damaged to the extent which liberates the bitter material referred to above. This homogenization can be continued for a sufficient length of time to produce a semi liquid material in which substantially all of the natural cells of the pulp of the fruit have been ruptured and the homogenized material is primarily a suspension of finely divided solids in an aqueous solution of water soluble material including the carbohydrate-protein complex.

An alternate procedure is to stop the homogenizing operation as soon as the residual seeds have been liberated from the berries and the pulp and skins become a fluid mass. The seeds can then be screened from this fluid mass after which the separated material can be subjected to more intense homogenization in the same or similar apparatus to more thoroughly break down the cells of the pulp.

The amount of water added for the homogenizing operation should be enough to provide a readily flowable and separable mixture of the homogenized material from which a low viscosity aqueous solution of the carbohydrate-protein complex can be separated. Too little water results in inadequate separation and too much water results in unnecessary dilution of the aqueous solution. Thus amounts of added water between approximately 1½ times the weight of the original berries up to 3 or 4 times this weight can be employed.

As indicated at 16, the aqueous material or partly diluted juice is separated from the solids including any residual seeds which may be present preferably by a filtering operation followed by a high speed centrifugal clarification operation. Thus the semiliquid material from the homogenizer can be filtered, for example, in a conventional filter press or similar apparatus employing cloth filter bags. In general, such an operation will not remove all of the very finely divided suspended solids from the separated aqueous liquid. These solids can, however, be removed in high speed centrifugal separators now available commercially to clarify the aqueous liquid. A filtering operation only can be employed by adding a suitable filter aid in the form of a finely divided inert material or the entire separation can be carried out in a high speed centrifugal separator.

In any case the solid residue from either a filtering operation or a centrifugal separation is washed with water as also indicated at 16 and this wash water is separated from the solid residue and added to the separated juice to provide a diluted juice. Preferably the washing is repeated several times with decreasing amounts of water. The total amount of water indicated at 17 employed for washing will, in general, be approximately equal to the original weight of the berries being processed so that the total weight of water added to the diluted juice will be approximately three times that of the original berries being processed. The separated solids are discharged from the process as indicated at 18.

The diluted juice is then subjected to a dialyzing operation as indicated at 20. The preferred dialyzing membrane is regenerated cellulose, preferably that produced by the cupra-ammonium process. This dialyzation can be accomplished by known procedures, for example, by introducing the solution to be dialyzed into cellophane bags and suspending such bags in water or flowing the liquid material through tubular regenerated cellulose member positioned in water. The water should be as free as is practicable from ions and small molecules which will diffuse back into the liquid being dialyzed. Water soluble impurities, most of which have molecular weight below 500, will diffuse through the diaphragm into the water and can be discarded from the process as indicated at 12. Best results are obtained if the temperature of the liquids in contact with the diffusion membranes is maintained between approximately 4° and 10° centigrade. The time required to remove most of the dialyzable impurities and produce a purified sweet liquor will usually range from approximately 3 to 5 hours.

With the amount of water discussed above as being added in the prior homogenizing and washing operations, the purified sweet liquor from the dialyzing operation will have a viscosity similar to that of a light corn syrup commercially sold for table use. This viscosity may, however, be adjusted by adding water if the viscosity is greater than that desired or by evaporating water under vacuum conditions at a temperature below about 65° and preferably below 55° C., if the viscosity is less than that desired. The liquid material thus produced is an aqueous solution of the carbohydrate-protein complex discussed above. A purified sweet liquor having the viscosity above discussed contained 42 milligrams of the complex per 100 grams of water, which is a concentration on a weight basis of approximately 0.042%. Nevertheless, 1 gram of such purified sweet liquor has the sweetening effect of approximately 6 grams of dry cane or beet sugar. This purified sweet liquor is chemically stable at ambient temperature below about 65° C. and can be stabilized against fungicidal action by the addition of a stabilizer as indicated at 24 to produce a stabilized product No. 1 indicated at 26. The stabilizer may be about 10% of benzoic acid or about 1.4% of methyl-p-hydroxybenzoate by weight based on the weight of the complex in the solution or may be a mixture of these stabilizing agents. This stabilized product can be employed in liquid form as a liquid sweetener either in the concentration at which it is recovered from the dialyzer or in more dilute or more concentrated form.

Alternatively, the purified sweet liquor from the dialyzing operation 20 can be subjected to a drying operation and then ground to a powder as indicated at 28. The powder is essentially the carbohydrate-protein complex in purified form and is also a temperature stable material at temperatures below 65° C. This material can be stabilized against fungicidal action or bacterial action as indicated at 30. Sodium chloride in powdered form is an effective stabilizer and can be added in small amounts, for example, 1% on weight basis to the dried and powdered material to produce a product No. 2, which can also be used as a solid sweetener, as indicated at 32. It will be apparent, however, that the sodium chloride may be dissolved in the purified solution prior to the drying operation.

The carbohydrate portion of the carbohydrate-protein complex referred to above may, however, be separated from the protein. A preferred manner of liberating the carbohydrate from the protein is to irradiate a shallow body or layer of an aqueous solution of the complex with ultraviolet light. The irradiated solution may be the sweet liquor discussed above suitably adjusted in viscosity if necessary. The irradiation is preferably carried out when the solution has viscosity of between approximately 1.5 and 11 centipoises, the optimum viscosity being around 5.6 centipoises. The purified juice from the dialyzing operation 20 can be adjusted in viscosity as indicated at 34 in the manner discussed above, preferably to 5.6 centipoises. As indicated at 36, it can then be irradiated with ultraviolet light, for example, that from a quartz mercury vapor lamp. Such a lamp has a wide range of wavelengths in the ultraviolet and has its most intense radiation in this range at a wavelength of approximately 2532 angstrom units. This irradiation is preferably carried out while the liquid is at a temperature between approximately 2 and 8° C.

The intensities and principal wavelengths of the ultraviolet radiation from different types of ultraviolet sources vary over a substantial range and the intensity of the radiation even for the same type of source varies from unit to unit. The best test of the optimum time for irradiation treatment is therefor the extent of denaturing of the carbohydrate-protein complex of breaking of the chemical bond between the carbohydrate and protein is the amount of recovery of the carbohydrate after precipitation of the protein in the irradiated solution and removal of the precipitated material, as described below. Recoveries of 80 to 90% can be obtained using a quartz mercury vapor lamp and radiation time from 10 minutes to one hour or more, depending upon the intensity of the radiation.

Although the employment of ultraviolet irradiation for breaking down the carbohydrate-protein complex referred to is the most efficient, other treatments for this purpose are possible, such as subjecting the solution of the complex to ultrasonic vibration, X-ray radiation, radiation from radioactive isotopes, hydrolysis with dilute acids or enzyme treatment.

The liberated protein can be precipitated as indicated at 38 by one of a number of protein precipitating agents indicated as being added at 39, a preferred agent being polyvinylalcohol of sufficiently low molecular weight to be a thin liquid, for example, in an amount equal to approximately 20% by volume of the resulting solution containing the protein and liberated carbohydrate. Various other protein precipitation agents can be employed, for example, trichloroacetic acid, a chloroform-amyl alcohol mixture or an aqueous solution made by adding 1.25 volumes of ethanol saturated with potassium acetate to one volume of water and adding dilute potassium hydroxide to provide a pH of 8 to 9. These precipitation agents also precipitate any of the residual carbohydrate-protein complex which has not been broken down.

The precipitated material is preferably centrifugally separated from the resulting carbohydrate solution, since it can be substantially completely removed as indicated at 40 by continuous centrifugal separation in a commercial type of high speed continuous centrifugal separator. Thus the precipitated solids have sufficient flow characteristics to be continuously discharged from the bowl of the separator and from the process as indicated at 42.

The amount of precipitating agent added to the aqueous material containing the liberated protein will vary with the particular agent employed and with the amount of protein present in the material. No more than the amount necessary to precipitate substantially all of the protein should be employed in order to avoid as far as possible the addition of extraneous materials to the material being treated. The minimum amount of protein precipitating agent which will precipitate substantially all of the protein can be determined in each operation or for individual batches of such aqueous material by making preliminary tests on small amount of this material or by adding the precipitating agent in increments to a batch of such aqueous material and making tests on small portions of such batch after each increment to see if additional precipitating agent is required.

Alternatively the protein can be both precipitated and removed by absorption on such materials as a bed of zinc hydroxide or a clay such as kaolin, these materials also acting as a filter material to separate the precipitative protein from the solution.

In any case, the separated solids are preferably washed with small amounts of water and the washing water added to the liquid material separated from the solids. The resulting liquid material is a purified carbohydrate solution. This solution can be adjusted in viscosity, if desired, and may have a stabilizer such as the methylparaben in the amount referred to above, added as indicated at 44 to produce a liquid sweetener indicated at 46 as product No. 3, which is essentially carbohydrate solution in which the carbohydrate has a sweetening effect upon a dry weight basis about 1500 times that of sucrose. For example, one gram of a solution having the 0.042% concentration by weight referred to above has a sweetening effect substantially equal to 60 grams of dry cane or beet sugar. The product indicated as product No. 3 at 46 is temperature stable to the same degree as the liquid sweetener product 26 and may be sold in concentrated or dilute form for use as a liquid sweetener.

The purified carbohydrate solution from the centrifugal separation 40 can be dried and ground to a powder as indicated at 48 in exactly the same manner that the drying operation indicated at 28 is carried out. Powdered sodium chloride in the proportion indicated above can be added to such powdered material as indicated at 50 to produce a stabilized solid sweetener product indicated as product No. 4 at 52. Either of the dry sweetener products 32 or 52 can be pressed into small pellets or tablets.

It should be pointed out that, if the diluted juice from the separating operation 16 is to be subjected to further treatment to liberate the carbohydrate from the carbohydrate-protein complex, the dialyzation operation 20 can be omitted before subjecting the resulting sweet liquor to ultraviolet irradiation or other steps for breaking down this complex. The dialyzation operation can then be performed on the aqueous solution containing the carbohydrate after the separation 40 of the precipitated protein from such aqueous solution to produce a purified carbohydrate solution.

I claim:

1. The method of recovering a water soluble sweetening material from *Dioscoreophyllum cumminsii* berries, which comprises:
   separating substantially all of the seeds from the skin and pulp of said berries;
   thereafter subjecting said skin and pulp to high speed homogenization in the presence of added water to break down the cells of said pulp to produce a separable mixture of an aqueous liquid having water soluble material including said sweetening material as part of a carbohydrate-protein complex in solution and finely divided water insoluble material in suspension;
   separating said aqueous liquid from said suspended solid material including high speed centrifugal separation for removing substantially all of said suspended solid material from said aqueous liquid to produce an aqueous solution of said water soluble material substantially free of suspended solids;
   irradiating said aqueous solution with ultraviolet radiation to break the chemical bond between the carbohydrate and protein of said water soluble carbohydrate-protein complex;
   and thereafter precipitating said protein and separating said protein from the remaining aqueous material to recover said aqueous material containing said carbohydrate in solution in water.

2. The process of claim 1 in which the separating of said aqueous liquid from said solid material includes filtering said mixture to remove the major portion of said solid material from said liquid prior to said centrifugal separation.

3. The process of claim 1 which includes a dialyzing operation to remove from the materials being processed impurities having a molecular weight below about 10,000 to produce a purified carbohydrate solution.

4. The process of claim 1 in which a small amount of methyl-p-hydroxybenzoate is added to said aqueous material to produce a liquid sweetener product which is essentially an aqueous solution of said carbohydrate stabilized against fungicidal action.

5. The process of claim 1 in which said aqueous material is dried by evaporation of water at a temperature below 55° C. and under vacuum conditions to provide a dry carbohydrate product which is essentially a water soluble carbohydrate.

6. The process of claim 5 in which a small amount of sodium chloride is added to a said carbohydrate product to produce a dry sweetener product stabilized against fungicidal action.

7. The process of claim 1 in which said protein is separated from said aqueous material by continuous centrifugal separation.

References Cited

UNITED STATES PATENTS

| | | | |
|---|---|---|---|
| 3,391,009 | 7/1968 | Fehlberg et al. | 99—205 |
| 2,570,272 | 10/1951 | Pilcher | 99—141 |

OTHER REFERENCES

Inglett et al.: Serendipity Berries, Source of New Intense Sweetener, Journal of Food Science, volume 34, 1969, pp. 408–411.

Chemicals Used in Food Processing; National Academy of Sciences, National Research Council, 1965, Publication 1274, p. 3.

RAYMOND N. JONES, Primary Examiner

R. B. ANDEWELT, Assistant Examiner